M. H. COLLINS.
RULE.
APPLICATION FILED SEPT. 6, 1918.

1,332,887.

Patented Mar. 9, 1920.

INVENTOR.
Martin H. Collins
BY
W. W. Williamson
ATTORNEY.

UNITED STATES PATENT OFFICE.

MARTIN H. COLLINS, OF PHILADELPHIA, PENNSYLVANIA.

RULE.

1,332,887.　　　　Specification of Letters Patent.　　Patented Mar. 9, 1920.

Application filed September 6, 1918. Serial No. 252,854.

*To all whom it may concern:*

Be it known that I, MARTIN H. COLLINS, a citizen of the United States, residing at Philadelphia, in the county of Philadelphia and State of Pennsylvania, have invented new and useful Improvements in Rules, of which the following is a specification.

My invention relates to new and useful improvements for rule, and has for its object to provide a device of this character with means whereby circles or arcs thereof may be transcribed with the use of a centering such as a nail or other relatively sharp instrument and a marking device such as a pencil or nail.

A further object of my invention is to provide a rule with a number of spaced holes so that the same may be used for transcribing circles thereby making it unnecessary for a workman to carry a compass.

A further object of the invention is to provide a holding rule having an extension slide with suitable holes and slots whereby with the use of a centering instrument and marking device circles or arcs of circles having any radius within the limits of the rule may be drawn.

A still further object of the invention is to provide a rule having an extension slide with means whereby it may be used for transcribing circles having radii of different subdivisions of the rule, as for instance, from one to 11 inches, to provide the extension slide with means whereby circles having radii of additional inches or subdivisions of an inch may be drawn.

With these ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application, in which:—

Figure 1:
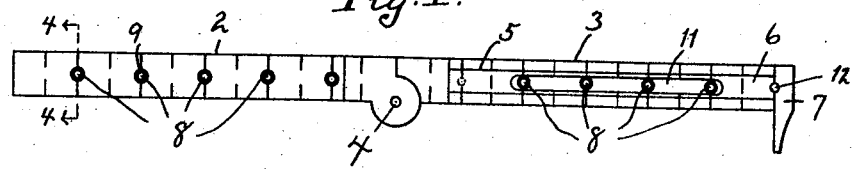
Figure 1, is a face view of a two piece folding rule provided with an extension slide illustrating my invention applied thereto.
Figure 2:
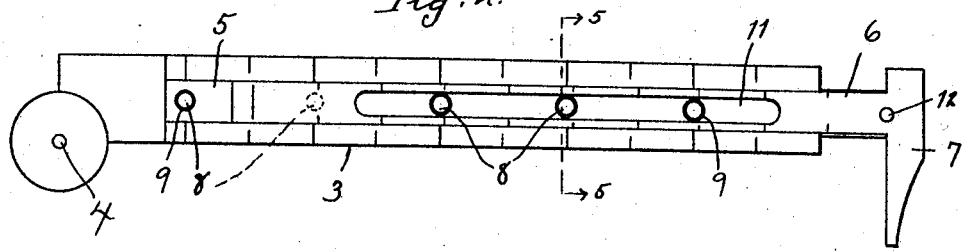
Fig. 2, is an enlarged face view of one of the parts or sections of the rule illustrating the extension slide partly withdrawn.
Figure 3:
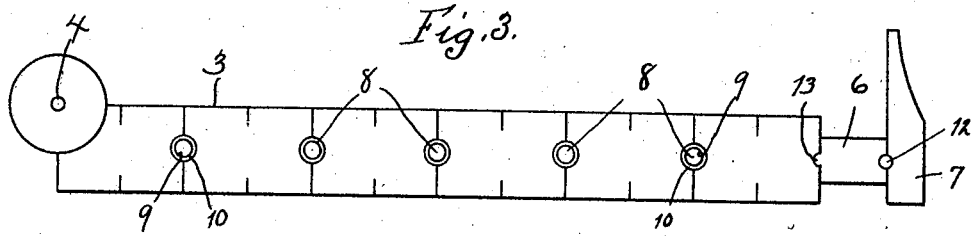
Fig. 3, is a reversed face view thereof.
Figure 4:
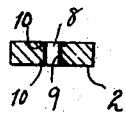
Fig. 4, is an enlarged section at the line 4—4 of Fig. 1.

In carrying out my invention as embodied in Figs. 1 to 5 inclusive, 2 and 3 represent the parts or sections of a folding rule pivoted together as at 4.

In the part 3 is formed a groove 5 for the reception of the extension slide 6 provided with a head 7 at its outer end and on this extension slide as well as the parts or sections 2 and 3 of the rule are suitably designated divisions of a measure, as for instance, linear measure.

Figure 5:
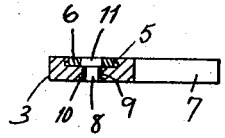
Fig. 5, is a section at the line 5—5 of Fig. 2.

In each of the parts or sections 2 and 3 of the rule are formed a plurality of holes 8, their centers being located on any of the divisions or subdivisions of the measure and for convenience of illustration they have been shown equally spaced and situated at the inch divisions of the measure. Where the rule is made of wood or other relatively soft material each of the holes has located therein a sleeve or jacket 9 preferably having at each end an outwardly projecting flange 10 embedded in the material of the rule so that the outer faces of said flanges are flushed with the faces of the rule, but where the holes communicate with the extension slide groove 5, the flange at the end of the jacket or sleeve communicating with said groove may be dispensed with as shown in Fig. 5.

In the extension slide 6 is formed a longitudinal slot 11 in alinement with the holes 8 in the part or section 3 of the rule whereby the majority of the holes 8 in said part or section 3 may be utilized under certain conditions.

At the outer end of the extension slide is formed a hole 12 the center of which is located on the joining line of the slide with its head so that when said slide is not in use or is in its closed position, said hole 12 is located at the end of the rule or the part or section 3 of said rule and in order that said hole may be used when the slide is in its closed position, a semicircular notch 13 is formed in the end of the rule or rule section 3.

In practice, to transcribe a circle or arc of a circle it is only necessary to lay the rule flat upon the work to be marked and then place the centering instrument and the marking device in the proper hole the desired distance apart equal to the radius of the arc or circle desired until they rest upon the work, or until the centering device pierces the work and the marking device engages the same, then by moving the marking device while inserted in one of the holes in the rule, a circle will be transcribed upon the work as will be obvious. When the rule is constructed as above described, circles having radii of an inch or multiple thereof within the limits of the rule may be transcribed by using the different holes formed in the rule or sections thereof or when it is necessary to transcribe a circle having a radius of some subdivision of an inch, as for instance, one and one-sixteenth inches, one and one-eighth inches, one and one-quarter inches or one and one-half inches, as here shown, then the centering device is placed in the holes at the end of the rule adjacent the hole 12 when the extension slide and the marking device is placed in said hole 12 in the extension slide so that a circle having a three inch diameter will be transcribed.

Figure 6:
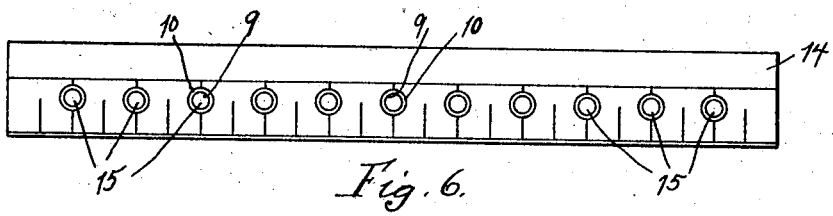
Fig. 6, is a face view of an ordinary one piece rule showing my invention applied thereto.

In Fig. 6 I have shown an ordinary one piece relatively narrow rule 14 having a number of holes 15 therein located at certain subdivisions of the linear measure, as for instance, each inch, so that circles or arcs of circles with a radii of one inch or any multiple thereof within the limits of the rule may be readily transcribed as above described and if found desirable, in these holes may be mounted suitable bushings, jackets or sleeves similar to those designated by the numeral 9 in my preferred form of rule.

Of course I do not wish to be limited to the exact details of construction as herein shown, as these may be varied within the limits of the appended claims without departing from the spirit of my invention.

Having thus fully described my invention, what I claim as new and patentable is:—

1. A folding rule comprising a number of sections hinged together, each of said sections having holes therethrough and one of said sections provided with a groove, and an extension slide mounted in said groove, said slide having a hole at its outer end and provided with a longitudinal slot in alinement with the holes in said section.

2. A rule comprising a number of sections hinged together, one of said sections having a groove therein, all of said sections being provided with measure designation marks and having holes therethrough located at certain of said designation marks, the holes in the grooved section communicating with the groove, the grooved section also having a semicircular notch in its outer end, bushings in said holes, and an extension slide mounted in the groove and provided with a head, said slide and head having a hole therethrough which alines with the notch in the end of the grooved section when the slide is in its closed position, said slide also having a longitudinal slot therein to permit access to the majority of the holes in the grooved section, said holes being used as locations for a centering instrument and marking device whereby circles or their arcs of given radius may be drawn.

3. A rule provided with a groove at one end also having holes therethrough at certain sub-divisions thereon, some of said holes communicating with the groove and further provided with a semicircular notch at the outer end of the groove and an extension slide mounted in the groove and provided with a head, said slide and head having a hole therethrough which alines with the notch when the slide is in its closed position, said slide also having a longitudinal slot therein to permit access to the majority of the holes in the region of the groove, for the purpose stated.

In testimony whereof, I have hereunto affixed my signature.

MARTIN H. COLLINS.